US010043615B2

(12) United States Patent
Bendale et al.

(10) Patent No.: US 10,043,615 B2
(45) Date of Patent: *Aug. 7, 2018

(54) ELECTRODE POROSITY FOR THREE-VOLT ULTRACAPACITOR (71) Applicant: Maxwell Technologies, Inc., San Diego, CA (US)

(72) Inventors: Priya Bendale, San Diego, CA (US); Robert Crawford, San Diego, CA (US); Porter Mitchell, San Diego, CA (US); Jeffrey Nelson, San Diego, CA (US); Doug Schafer, San Diego, CA (US); Xiaomei Xi, San Diego, CA (US)

(73) Assignee: Maxwell Technologies, Inc., San Diego, CA (US)

(*) Notice: Subject to any disclaimer, the term of this patent is extended or adjusted under 35 U.S.C. 154(b) by 517 days.

This patent is subject to a terminal disclaimer.

(21) Appl. No.: 14/047,860

(22) Filed: Oct. 7, 2013

(65) Prior Publication Data
US 2014/0098465 A1 Apr. 10, 2014

Related U.S. Application Data (60) Provisional application No. 61/711,072, filed on Oct. 8, 2012, provisional application No. 61/711,046, filed
(Continued)

(51) Int. Cl.
H01G 9/00 (2006.01)
H01G 9/02 (2006.01)
(Continued)

(52) U.S. Cl.
CPC ............ H01G 11/14 (2013.01); H01G 11/24 (2013.01); H01G 11/28 (2013.01); H01G 11/32 (2013.01);
(Continued)

(58) Field of Classification Search
CPC ........ H01G 9/155; H01G 11/24; H01G 22/32; H01G 11/84; H01G 9/022
(Continued)

(56) References Cited

U.S. PATENT DOCUMENTS 5,742,474 A 4/1998 Shimizu et al.
6,535,373 B1 3/2003 Smith
(Continued)

FOREIGN PATENT DOCUMENTS

CN 101536243 9/2009
CN 101542773 9/2009
(Continued)

OTHER PUBLICATIONS

AVX Corporation, "Bestcap® Ultra-low ESR High Power Pulse Supercapacitors," retrieved on Jul. 25, 2012 from the Internet at URL: http://web.archive,org/web/20120725071808/http://avx,com/docs/catalogs/bestcap,pdf, 26 pages.

Primary Examiner — Eric Thomas
Assistant Examiner — Arun Ramaswamy
(74) Attorney, Agent, or Firm — Knobbe Martens Olson & Bear, LLP (57) ABSTRACT An electric double-layer ultracapacitor configured to maintain desired operation at an operating voltage of three volts, where the capacitor includes a housing component, a first and a second current collector, a positive and a negative electrode electrically coupled to one of the first and second current collectors, a separator positioned between the positive and the negative electrode, and an electrolyte in ionic contact with the electrodes and the separator. At least one of the positive electrode and the negative electrode can be made of a carbon based layer having a mesoporosity and/or a microporosity optimized for ionic mobility therewithin.

7 Claims, 8 Drawing Sheets

Related U.S. Application Data on Oct. 8, 2012, provisional application No. 61/710,943, filed on Oct. 8, 2012, provisional application No. 61/711,142, filed on Oct. 8, 2012.

(51) Int. Cl.

| | | |
|---|---|---|
| *H01G 9/022* | (2006.01) | |
| *H01G 11/24* | (2013.01) | |
| *H01G 11/32* | (2013.01) | |
| *H01G 11/84* | (2013.01) | |
| *H01G 11/14* | (2013.01) | |
| *H01G 11/78* | (2013.01) | |
| *H01G 11/28* | (2013.01) | |
| *H01G 11/34* | (2013.01) | |
| *H01G 11/38* | (2013.01) | |
| *H01G 11/62* | (2013.01) | |
| *H01G 11/82* | (2013.01) | |
| *H01G 11/68* | (2013.01) | |

(52) U.S. Cl.
CPC ............ *H01G 11/34* (2013.01); *H01G 11/38* (2013.01); *H01G 11/62* (2013.01); *H01G 11/68* (2013.01); *H01G 11/78* (2013.01); *H01G 11/82* (2013.01); *H01G 11/84* (2013.01); *Y02E 60/13* (2013.01); *Y10T 29/417* (2015.01)

(58) Field of Classification Search
USPC .................................. 361/502, 503, 504, 505
See application file for complete search history.

(56) References Cited

U.S. PATENT DOCUMENTS

| | | |
|---|---|---|
| 2001/0021097 A1 | 9/2001 | Ohya |
| 2006/0148112 A1 | 7/2006 | Mitchell |
| 2009/0097188 A1 | 4/2009 | Mitchell |
| 2009/0103241 A1* | 4/2009 | Kikuchi .................. C01B 31/08 361/502 |
| 2009/0226797 A1 | 9/2009 | Yoshitake |
| 2009/0246631 A1 | 10/2009 | Hojo |
| 2010/0046142 A1 | 2/2010 | Aitchison |
| 2010/0276631 A1 | 11/2010 | Mabuchi et al. |
| 2010/0321863 A1 | 12/2010 | Kurakane |
| 2011/0292569 A1 | 12/2011 | Gadkaree |
| 2012/0156567 A1 | 6/2012 | Ayme-Perrot |

FOREIGN PATENT DOCUMENTS

| | | |
|---|---|---|
| EP | 1 667 251 | 6/2006 |
| EP | 1 724 795 | 11/2006 |
| EP | 2 472 650 | 7/2012 |
| JP | H0992583 | 4/1997 |
| JP | H11-204381 | 7/1999 |
| JP | 2004-031713 | 1/2004 |
| JP | WO2008/053919 | 5/2008 |
| JP | WO2009/072381 | 6/2009 |
| JP | 2011-176043 | 9/2011 |
| TW | 200531103 | 9/2005 |
| WO | WO 03/094184 | 11/2003 |
| WO | WO 2009/011371 | 1/2009 |
| WO | WO 2010/042526 | 4/2010 |
| WO | WO 2011/091092 | 7/2011 |
| WO | WO 2011/149807 | 12/2011 |

* cited by examiner

ELECTRODE POROSITY FOR THREE-VOLT ULTRACAPACITOR

CROSS REFERENCE TO RELATED APPLICATIONS

This application claims the benefit of U.S. Provisional Patent Application Ser. No. 61/711,072, filed Oct. 8, 2012, entitled "CARBON SURFACE MODIFICATION FOR THREE-VOLT ULTRACAPACITOR," and U.S. Provisional Patent Application Ser. No. 61/711,046, filed Oct. 8, 2012, entitled "ELECTROLYTE FOR THREE-VOLT ULTRACAPACITOR," and U.S. Provisional Patent Application Ser. No. 61/710,943, filed Oct. 8, 2012, entitled "COATED HOUSING FOR THREE-VOLT ULTRACAPACITOR," and U.S. Provisional Patent Application Ser. No. 61/711,142, filed Oct. 8, 2012, entitled "THREE-VOLT ULTRACAPACITOR ELECTRODE WITH MACROPOROSITY," each of which is incorporated herein by reference in its entirety.

BACKGROUND OF THE INVENTION

Field

The present invention relates generally to electrical energy storage devices, and, more specifically, to the design of electrodes for electrical energy storage devices, such as double-layer capacitors.

Description of the Related Art

Electrical energy storage cells are widely used to provide power to electronic, electromechanical, electrochemical, and other useful devices. Such cells include primary chemical cells, secondary (rechargeable) cells, fuel cells, and various species of capacitors, including ultracapacitors. Some characteristics of electrical energy storage cells include energy density, power density, charging rate, internal leakage current, equivalent series resistance (ESR), and ability to withstand multiple charge-discharge cycles. For a number of reasons, capacitors that can store relatively large amounts of charge, known as supercapacitors and ultracapacitors, have gained prominence among the various electrical energy storage cells.

Increases in operating voltage of ultracapacitors can provide enhanced energy storage and power capabilities. However, various components of the capacitor may exhibit instabilities when subject to operating conditions of increased voltage. For example, instabilities in one or more components of the capacitor may contribute to deterioration in capacitor performance, including but not limited to excessive capacitance fade and Equivalent Series Resistance (ESR) increases on cycling or in DC lifetime also referred to as calendar lifetime, self-discharge, pseudocapacity, and/or gas formation.

SUMMARY

One embodiment is a capacitor configured to operate at a voltage of 3 volts or greater and including: a first current collector and a second current collector, a positive electrode electrically coupled to the first current collector, and a negative electrode electrically coupled to the second current collector, where at least one of the positive electrode and the negative electrode is made of a carbon based layer having a microporosity and a mesoporosity optimized for ion mobility therewithin. The capacitor may also include a separator positioned between the positive electrode and the negative electrode, an electrolyte in ionic contact with the positive electrode and the negative electrode, and a housing component to retain the positive electrode, the negative electrode, the separator and the electrolyte.

In some embodiments, the capacitor can be configured to provide a desired performance while operating the capacitor at 65° C. with a cycle life of greater than 500 k cycles. In some embodiments, the capacitor can be configured to provide a desired performance while operating at 3 volts or greater at 65° C. and maintaining greater than 80% of its initial capacitance and/or less than 200% of its initial equivalent series resistance for over 1500 hours.

In some embodiments, the carbon based layer has a microporosity of about 60% to about 85%. In some embodiments, the carbon based layer has a microporosity of about 70% or about 80%. In some embodiments, the carbon based layer has a mesoporosity of about 10% to about 35%. In some embodiments, the carbon based layer has a mesoporosity of about 20% or about 25%. In some embodiments, the carbon based layer has a macroporosity of less than about 5%. In some embodiments, the carbon based layer has a macroporosity of less than about 1%.

Another embodiment is a method of making an ultracapacitor configured to operate between about 2.8 volts to about 3 volts. The method includes providing a carbon based layer having a microporosity and a mesoporosity optimized for ionic mobility therewithin; forming a first electrode and a second electrode, at least one of the first electrode and the second electrode comprising at least one of the carbon based layers; separating the first electrode and second electrode with a separator; and inserting the first electrode and second electrode into a housing to form the ultracapacitor.

One other embodiment is an ultracapacitor having a first current collector and a second current collector; a positive electrode electrically coupled to the first current collector; a negative electrode electrically coupled to the second current collector, where at least one of the positive electrode and the negative electrode is made of a carbon based layer having a mesoporosity of about 20% to about 25%, and a microporosity of about 70% to about 80%; a separator positioned between the positive electrode and the negative electrode; an electrolyte in ionic contact with the positive electrode and the negative electrode; and a housing component to retain the positive electrode, the negative electrode, the separator and the electrolyte and wherein the ultracapacitor is capable of operating at 3 volts at a temperature of 65° C. or greater while maintaining less than 200% of its initial equivalent series resistance for over 1500 hours.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Figure 1:
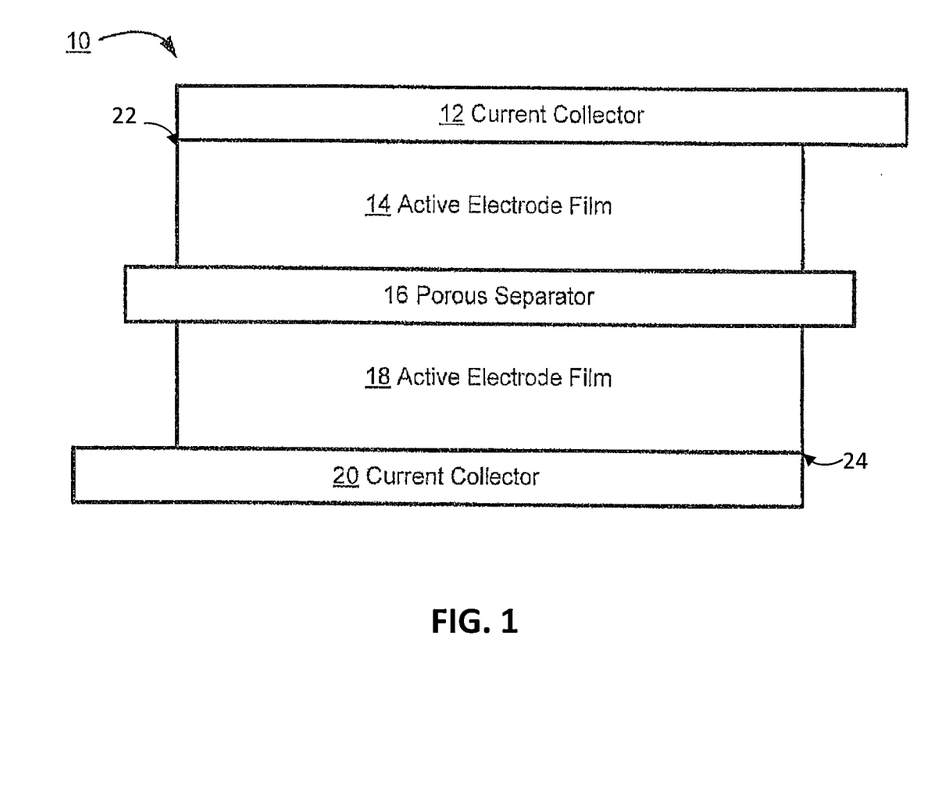
FIG. 1 is a block diagram showing a simplified cross-sectional view of an example electric double-layer ultracapacitor.

FIG. 1 shows a simplified cross-sectional view of a portion of an example electric double-layer ultracapacitor 10. The example portion of double-layer ultracapacitor 10 includes a first electrode 22, for example a positive electrode, having a first active electrode portion 14, and a second electrode 24, for example a negative electrode, having a second active electrode portion 18. A separator 16 is positioned between the electrodes 22, 24 to maintain a separation between the first electrode 22 and the second electrode 24. An electrode may comprise a current collector to facilitate electrical contact between the electrode and an external circuit. Referring to FIG. 1, for example, the positive electrode 22 includes a first current collector 12 electrically coupled to the first active electrode portion 14 and a second current collector 20 is electrically coupled to the second active electrode portion 18. The separator 16 and both electrodes 22, 24 may be immersed in an electrolyte (not shown). The electrolyte may permeate the separator 16 and the active electrode portions 14, 18, facilitating for example ion mobility between the electrodes 22, 24.

Embodiments of the invention relate to technologies for increasing the operating voltage of an ultracapacitor to 3 volts or greater. These technologies, as described below, allow an ultracapacitor to operate at 3 volts or greater, while minimizing the disadvantageous side effects that such a relatively high voltage can have on the ultracapacitor. In particular, increasing voltage has been found to cause an increase in the rate of secondary electrochemical reactions that occur within the ultracapacitor. For example, secondary electrochemical reactions can occur between an ultracapacitor electrolyte (e.g., an acetonitrile based electrolyte) and one or more other materials of the ultracapacitor. These reactions have been found to be sensitive to operating voltages, and the reaction rate can increase as voltage on the capacitor is increased. The byproducts of the reactions can cause increased build-up of gas of various constituents within the ultracapacitor, including for example $H_2$ and $CO_2$, which may cause pressure build-up within the device and/or leaking of the device. In addition, in ultracapacitors having aluminum current collectors, the aluminum current collector may contribute to the secondary reactions, which can result in an increased internal resistance of the device. Finally, the secondary reactions may result in physical and/or chemical modification of the carbon-based electrodes and electrode structures, which has a detrimental impact on the ultracapacitor performance, including for example, a capacitance of the ultracapacitor.

The following technologies, used separately, or in combination with one another can alleviate or reduce the issues caused by operating an ultracapacitor at 3 volts or greater, particularly at higher temperatures, such as 60° C., 65° C., 70° C., 75° C. or greater temperatures while maintaining more than 80% of its initial capacitance over 1500 hours, more than 80% of its initial capacitance over a number of cycles (e.g., cycling between a rated voltage of the capacitor to a half voltage), less than 200% of its initial ultracapacitor equivalent series resistance (ESR) over 1500 hours, and/or less than 200% of its initial ultracapacitor equivalent series resistance (ESR) over a number of cycles (e.g., cycling from a rated voltage of the capacitor to a half voltage). In some embodiments, the technologies described herein, used separately or in combination with one another, facilitates operation of an ultracapacitor at 3 volts while demonstrating less than a target leakage current over a period of time (e.g., less than a leakage current of 18 milliamperes (mA) over a number of hours, such as over 72 hours) and/or demonstrating a self discharge of less than 25% over a period of time, such as over 72 hours.

Technologies described herein may also be used separately or in combination with one another to enable a desired operation of an ultracapacitor at an operating voltage of 3 volts or greater at a temperature of about 65° C. for greater than or equal to 500 k cycles. For example, an ultracapacitor may include one or more technologies described herein to enable the ultracapacitor to maintain or substantially maintain a capacitance greater than about 80% of its initial capacitance, and/or less than 200% of its initial equivalent series resistance when operating at a voltage of 3 volts or greater over a period of about 1,500 hours, and/or over greater than or equal to 500 k cycles, and at a temperature of about 65° C. In other embodiments, the ultracapacitor is enabled to maintain at least 75%, 85%, 90%, 95% or 99% of its initial capacitance when operating for a period of 1500 hours, and/or over greater than or equal to 500 k cycles at 65° C. or greater.

DEFINITIONS

As used herein, capacitance (F—Farads) is a measurement of energy storage in joules. $C=qV$ As used herein, the voltage is the maximum operating voltage for a single capacitor. The rated voltage is the voltage at which the performance data is measured. It is possible for the capacitors to experience voltages in excess of the rated voltage. The impact is dependent on the time and temperature during this exposure.

As used herein, Surge Voltage is the maximum voltage that an ultracapacitor can operate at for a short periods of time with minimal damage or cell opening.

As used herein, Internal Resistance (DC) is the resistance corresponding to all the resistive components within the ultracapacitor, $R_{tot}$. This measurement is taken at the end of the discharge of the device and specifically some number of seconds, typically 5 seconds after the discharge current has ceased to flow (ESR=$\Delta$V/abs(I)). Since the time constant of the ultracapacitors is approximately 1 second, it takes approximately 5 time constants or 5 seconds to effectively remove 99.7% of the stored energy. $R_{tot}$ is comprised of resistive components attributed to contact or interconnect resistance, electrode conductive resistance, electrolyte conductive and ionic resistance, and other material resistances.

As used herein Cycle Life is the expected performance characterization of an ultracapacitor when cycled from rated voltage to half rated voltage for 50 k cycles, 500 k cycles, 1 million (M) cycles or any number of cycles when cycling the ultracapacitor between rated voltage to half rated voltage. In one embodiment, cycling is performed at a duty cycle and current level which results in no or substantially no rise in the internal and/or external body temperature of the ultracapacitor with the ultracapacitor maintaining a temperature equal to or substantially equal to 65° C.

Housing with Interior Coating

Figure 2:
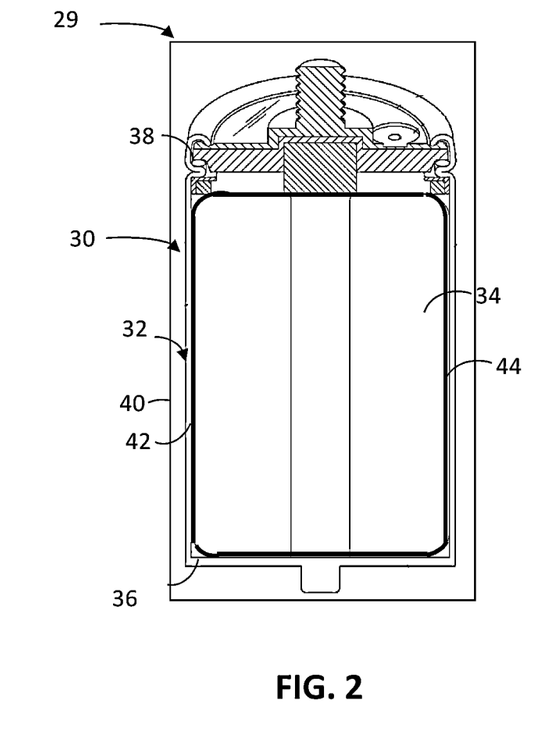
FIG. 2 is a cross-sectional perspective view showing an example housing component of an electric double-layer ultracapacitor.

Referring to FIG. 2, an electric double-layer ultracapacitor 29 may include a housing component 30, configured to receive and retain a positive electrode, a negative electrode, a separator and electrolyte as discussed above in reference to FIG. 1. The housing component 30 may include one or more walls 32, a base 36 and an upper lid 38 having an exterior surface 40 and an interior surface 42, where the interior surface 42 defines at least in part a housing interior space 34 configured to retain the positive electrode, the negative electrode, the separator and the electrolyte. For example, the housing component 30 may comprise a cylindrical container having a side wall 32, a base 36 and an upper lid 38. The side wall 32, base 36 and/or the upper lid 38 may be made of a conductive material. For example, the base 36 and/or the upper lid may include conductive material that allows for electrical contact with one or more current collectors (e.g., the current collectors 12 and 20, as shown in FIG. 1) to enable current flow from the current collectors to an external circuit. The conductive material of the side wall 32, the base 36 and/or the upper lid 38 may comprise aluminum, nickel, silver, steel, tantalum, other suitable metallic material, and/or combinations thereof. The housing component 30 may also take the form of other shapes (e.g., a housing component having a prismatic shape) and it not just limited to cylindrical shapes.

The interior surface 42 of the side wall 32 may be in contact with electrolyte. This may result in the chemical and/or electrochemical interaction between the electrolyte and the interior surface 42, for example generating byproducts which may degrade a performance of the capacitor. In one embodiment of the invention, a barrier film 44 may be applied to at least a portion of the interior surface 42 of the housing component 30 that is exposed to the electrolyte to provide a protective coating for the one or more interior surfaces 42.

The barrier film 44 may be applied to a portion of a side wall 32 interior surface, an interior surface of base 36, and/or an interior surface of upper lid 38. In some embodiments, the barrier film 44 may be applied to all or substantially all interior surface portions of the housing component 30 that are exposed to the electrolyte. In some embodiments, a portion of the base 36 and/or the upper lid 38 is uncoated or substantially uncoated by the barrier film 44, for example to reduce a degradation of electrical coupling between active components of the electrical capacitor and an external circuit.

In some embodiments, the barrier film 44 is applied to all or substantially all of the interior surface 42 of the side wall 32, except portions of the interior surface 42 of the side wall 32 configured to provide contact between active components of the ultracapacitor and an external circuit. For example, all or substantially all of the interior surface 42 of the side wall 32 may be coated by the barrier film 44 except portions of the interior surface 42 of the side wall 32 configured to provide electrical coupling to one or more current collectors of the ultracapacitor. In some embodiments, the uncoated portion of the interior surface 42 of side wall 32 can have an area configured to provide reduced interference by the barrier film 44 upon electrical coupling between the active components of the ultracapacitor and the external circuit (e.g., an area configured to reduce a degradation of the electrical coupling between the one or more current collectors of the ultracapacitor and the external circuit), while providing desired coating of the interior surface 42 of the side wall 32 for facilitating reduced interaction with the electrolyte.

For example, a portion (e.g., a portion forming a band along the base 36 having a width) of the interior surface 42 of the side wall 32 proximate to and/or along the base 36 of the housing 30 may be uncoated by the barrier film 44. In some embodiments, the uncoated band has a width of less than about 10 millimeters (mm). For example, an uncoated portion of the interior surface 42 of the side wall 32 along the base 36 of the housing 30 can form a band having a width of about 5 mm in width. Of course other shapes and/or dimensions of uncoated portions may also be suitable. In some embodiments, the uncoated portion of the interior surface 42 of the side wall 32 can be at another location on the side wall 32.

In some embodiments, the barrier film 44 enables reduced chemical and/or electrochemical interaction between the one or more interior surfaces 42 and the electrolyte (e.g., facilitating a reduction in corrosion of the one or more interior surfaces 42). For example, the barrier film 44 may exhibit chemical resistance to the electrolyte and may provide a physical barrier between an interior surface 42 and the electrolyte so as to enable a reduction in the interaction between the interior surface 42 and the electrolyte, and a reduction in the generation of byproducts. In some embodiments, the barrier film 44 may prevent or substantially prevent all chemical interactions between the interior surface 42 and the electrolyte, particularly if the interior surface 42 is an aluminum surface.

The barrier film 44 may comprise a material having a desired mechanical strength, sufficient adhesion to the underlying interior surface 42 of the housing component 30, and/or chemical and/or electrochemical stability with respect to the electrolyte. In some embodiments, the barrier film 44 is free or substantially free of pin-holes, cracks, and/or other defects.

The barrier film 44 can have a sufficient thickness to provide desired separation between the electrolyte and the interior surface 42 while providing a coating having a reduced impact on a volume of the housing interior space 34 occupied by the barrier film 44. A volume of the housing interior space 34 occupied by the barrier film 44 may reduce a volume available for other components of the ultracapacitor. In some embodiments, the barrier film 44 is uniformly or substantially uniformly applied to portions of the interior surface 42. A variety of thicknesses may be suitable. For example, the barrier film of about 5 micrometers (μm) to about 40 μm. In some embodiments, the barrier film 44 can have a thickness of about 5 μm to about 55 μm. For example, the barrier film 44 applied to a portion of the interior surface 44 of the sidewall 32 can have a thickness of about 10 μm.

In some embodiments, the barrier film 44 can include an electrically non-conductive material, such as a polymeric material. For example, the barrier film 44 may comprise polyepoxide (e.g., epoxy resin), polyolefin (e.g., polypropylene (PP), polyethylene (PE, e.g., high-density polyethylene (HDPE), low-density polyethylene (LDPE)), polyimide, polyether ether ketone (PEEK), polyurethane, ethylene propylene rubber (EPDM, EPR), poly(p-xylylene) (e.g., parylene), fluorinated polymers (e.g., polytetrafluoroethylene (PTFE), polyvinylidene difluoride (PVDF), ethylene tetrafluoroethylene (ETFE), fluorinated ethylene propylene (FEP)), copolymers thereof, and/or combinations thereof.

In some embodiments, the barrier film 44 can include an electrically conductive film. The electrically conductive film may enable the portion of the interior surface 42 to maintain or substantially maintain a desired electrical contact with another ultracapacitor component (e.g., a current collector) and/or an external circuit. In some embodiments, the film includes an electrically conductive material having chemical and/or electrochemical resistance to the electrolyte, for example a conductive carbon material. The electrically conductive film can be made of graphite (e.g., graphitic ink, graphitic slurry, graphene). For example, the film can include a mixture comprising an electrically conductive carbon material (e.g., graphite and/or graphene) and a binder material (e.g., a thermoplastic binder material). In some embodiments, the mixture can be a dispersion of the electrically conductive carbon in a thermoplastic binder, such as a water-based dispersion. For example, the barrier film 44 can be made of a water-based dispersion of graphite in a thermoplastic binder material. The barrier film 44 made of a conductive carbon can have a desired electrical conductivity, for example a sheet resistance of less than about 30 ohms per square ("Ω/sq") at a thickness of about 25 μm.

In some embodiments, the barrier film 44 can include an electrically non-conductive film, an electrically conductive film, and/or a combination thereof. For example, the barrier film 44 can include only an electrically non-conductive material (e.g., one or more polymeric films), only an electrically conductive material (e.g., one or more electrically conductive films made of a conductive carbon material), or an electrically non-conductive film over an electrically conductive film (e.g., one or more polymeric films over one or more electrically conductive carbon-based films). For example, a portion of interior surface 42 may be coated with a barrier film 44 including an electrically conductive film beneath a polymeric film, the electrically conductive film facilitating a reduction in interference by the polymeric film with an electrical contact between the portion of the interior surface 42 and a current collector of the ultracapacitor.

In some embodiments, an aluminum interior surface can be anodized to form a protective oxide barrier layer. In some embodiments, a stainless steel interior surface can be passivated to provide a barrier layer.

Figure 3A:
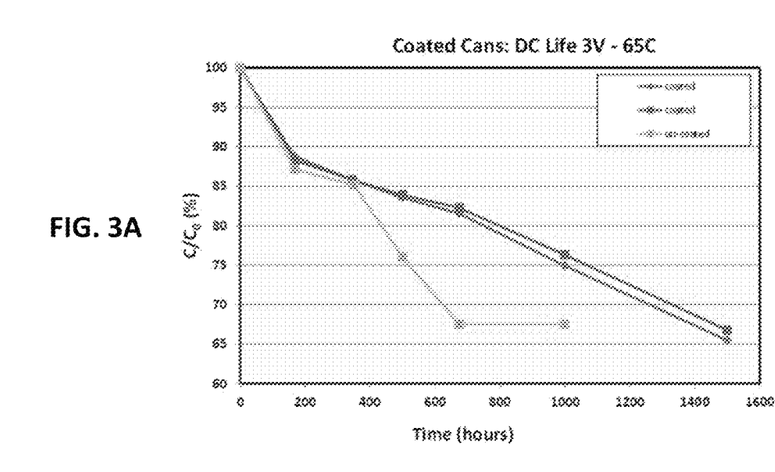
FIG. 3A shows capacitance performance of an electric double-layer ultracapacitor having a barrier film coating a portion of a housing component interior surface.

FIG. 3A shows capacitance performances (e.g., capacitance fade performance) of ultracapacitors having portions of an interior surface of their housing coated by a barrier film. The barrier file was an electrically conductive barrier film made of a carbon material, including graphite. The ultracapacitors had portions of an interior surface of a housing sidewall coated by the barrier film to reduce the interaction between the sidewall and the electrolyte while also reducing interference with electrical coupling between active components of the capacitor and an external circuit. The comparison is shown between the ultracapacitors having the barrier coating and control ultracapacitors having no barrier film on any portion of their housing interior surfaces. FIG. 3A shows that ultracapacitors that were coated with a graphite conductive barrier film had improved capacitance over time. For example, ultracapacitors having an interior surface of their sidewall coated by a barrier film demonstrated were found to retain about 75% of their capacitance at 1000 hours of operation at 3 volts and 65° C. in comparison to uncoated ultracapacitors which only retained about 68% of their capacitance under the same conditions at 1000 hours of operation. The coated ultracapacitors were found to be able to operate until about 1500 hours before reaching the same approximate 68% capacitance showing that the coating extended the capacitance lifetime for ultracapacitors running at 3 volts and 65° C.

Figure 3B:
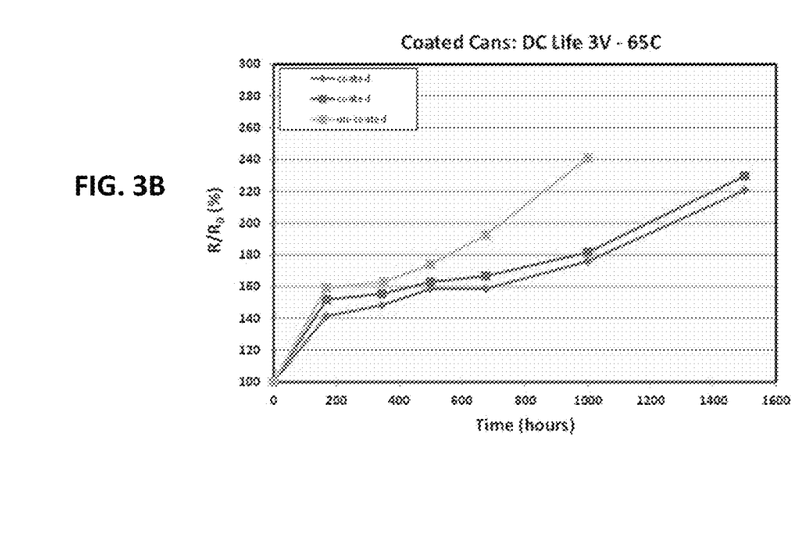
FIG. 3B shows a resistance performance of an electric double-layer ultracapacitor having a barrier film coating a portion of a housing component interior surface.

FIG. 3B shows the electrostatic resistance performance (e.g., ESR) of ultracapacitors having the interior surface of their housing coated by a barrier film made of carbon graphite in comparison to ultracapacitors having no barrier film. FIG. 3B shows that coated ultracapacitors were able to maintain a lowered ESR over time in comparison to uncoated ultracapacitors. A shown, the ESR of the coated ultracapacitors at 1500 hours of operation at 3 volts and 65° C. was lower than the ESR of uncoated ultracapacitors at only 1000 hours of operation under the same conditions.

Suitable methods to apply the barrier film 44 to an interior surface portion of the housing component 30 can include, for example, dip coating, spray coating, brush coating, liquid dispersion coating, vapor deposition, spin coating, wiping on, painting on and/or dripping.

Electrolyte

As described herein, electric double-layer ultracapacitors include electrolyte that is capable of transporting ions between a positive electrode (e.g., the positive electrode 22 shown in FIG. 1) and a negative electrode (e.g. the positive electrode 24 shown in FIG. 1). The electrolyte may be a solution having a solvent and a salt, with the salt providing ionic species for ionic conductivity and contact between the positive electrode and the negative electrode. A suitable electrolyte may also exhibit a low viscosity and/or a high degree of ionic conductivity, thereby enabling a decreased capacitor internal resistance and increased capacitor voltage during charging and discharging of the capacitor. For example, an increased solubility of the salt in the solvent may enable increased ionic conductivity between the positive the negative electrodes. A suitable electrolyte may exhibit chemical and/or electrochemical stability under the operating conditions of the ultracapacitor and may be able to withstand repeated charge discharge cycles of the ultracapacitor.

Electrolyte with an Acetonitrile Solvent and Various Salts

One embodiment of the invention is an ultracapacitor that exhibits stable performance when operating at 3 volts or more and includes an electrolyte that has a salt which exhibits increased solubility in the electrolyte solvent and can be chemically and/or electrochemically stable at the 3 volt operating voltage. This electrolyte may enable increased ion mobility, and/or may exhibit increased chemical and/or electrochemical stability under operating conditions of the ultracapacitor. In one example, the capacitor electrolyte solvent is acetonitrile.

In some embodiments, an electrolyte salt can include an ionic liquid. For example, a suitable electrolyte salt can include an ionic liquid which demonstrates desired stability at an operating voltage of 3 volts or higher, provides sufficient ionic conductivity between electrodes of the ultracapacitor, and/or demonstrates desired solubility in an acetonitrile electrolyte solvent.

An electrolytic salt may include a quaternary ammonium salt having desired solubility in an acetonitrile solvent.

In some embodiments, a cation of the electrolytic salt comprises spiro-(1,1')-bipyrrolidinium (SPB), triethylmethyl ammonium (TEMA), and/or tetraethyl ammonium (TEA). In some embodiments, an anion of the electrolytic salt comprises tetrafluoroborate and/or iodide. For example, the electrolyte may include a salt comprising spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, and/or tetraethyl ammonium iodide. For example, an electrolyte comprising triethylmethyl ammonium tetrafluoroborate, tetraethyl ammonium tetrafluoroborate, and/or spiro-(1,1')-bipyrrolidinium tetrafluoroborate can provide an electrolyte having increased salt solubility and improved chemically and/or electrochemically stability at increased operating voltages, where the electrolyte comprises an acetonitrile solvent.

In some embodiments, a cation of the electrolyte salt can include a symmetrical cation, including for example, triethylmethyl ammonium. In some embodiments, a cation of the electrolyte salt can include an asymmetrical cation, including for example, triethylmethyl ammonium. In some embodiments, the electrolyte salt can include spiro compounds, including symmetrical and asymmetrical spiro compounds. For example, the electrolyte can include N-spiro-bicyclic compounds, including symmetrical N-spirobicyclic compounds having 5-member cyclic rings. In some embodiments, the electrolyte can include an asymmetrical spiro compound, including asymmetrical spiro compounds having unequal sized ring structures. A symmetrical spiro compound can include a spiro-(1,1')-bipyrrolidinium tetrafluoroborate.

Electrolyte with Reduced Salt Concentration

Another embodiment of the invention is an ultracapacitor that can provide desired operation at an operating voltage of 3 volts or greater wherein the ultracapacitor includes an electrolyte having a lowered salt concentration in comparison to typical ultracapacitors. The electrolyte may include a salt having improved solubility in the electrolyte solvent, for example improved solubility in an acetonitrile-based solvent, such that the electrolyte may have a reduced salt concentration while maintaining or substantially maintaining a desired ionic conductivity between a positive electrode and a negative electrode of the ultracapacitor. This allows a reduction in the concentration of the ions while providing sufficient ionic transport between the electrodes without starving the ultracapacitor. An electrolyte having a reduced salt concentration may enable a reduced chemical interaction between the electrolyte and one or more other components of the ultracapacitor. The reduced chemical interaction may, for example, enable a reduced a rate of byproduct generation and therefore provide an improved ultracapacitor performance.

In some embodiments, the electrolyte with a reduced salt concentration enables the electrolyte to have a reduced electrolyte concentration non-homogeneity. The non-homogeneity can be created under non-uniform current densities within the ultracapacitor. The electrolyte concentration non-homogeneity may facilitate salt precipitation onto one or more electrode surfaces. This precipitation can, for example occlude one or more electroactive sites on an electrode and negatively impact the performance of the ultracapacitor. By using an electrolyte with a reduced salt concentration, the ultracapacitor may avoid an electrolyte concentration non-homogeneity when the ultracapacitor is operating at increased voltages, for example under high current charge and discharge cycling.

The electrolyte may include spiro-(1,1')-bipyrrolidinium tetrafluoroborate, tetraethyl ammonium tetrafluoroborate (TEA), triethylmethyl ammonium tetrafluoroborate (TEMA), spiro-(1,1')-bipyrrolidinium iodide, triethylmethyl ammonium iodide and/or tetraethyl ammonium iodide, in a solvent comprising acetonitrile. In this embodiment, the electrolyte may have a concentration within a range of about 0.5 moles/L (M) to about 1.0M, including from about 0.7 M to about 0.9M. For example, the electrolyte may include a 0.8M solution of tetraethyl ammonium tetrafluoroborate, triethylmethyl ammonium tetrafluorborate and/or spiro-(1,1')-bipyrrolidinium tetrafluoroborate in acetonitrile.

Figure 4:
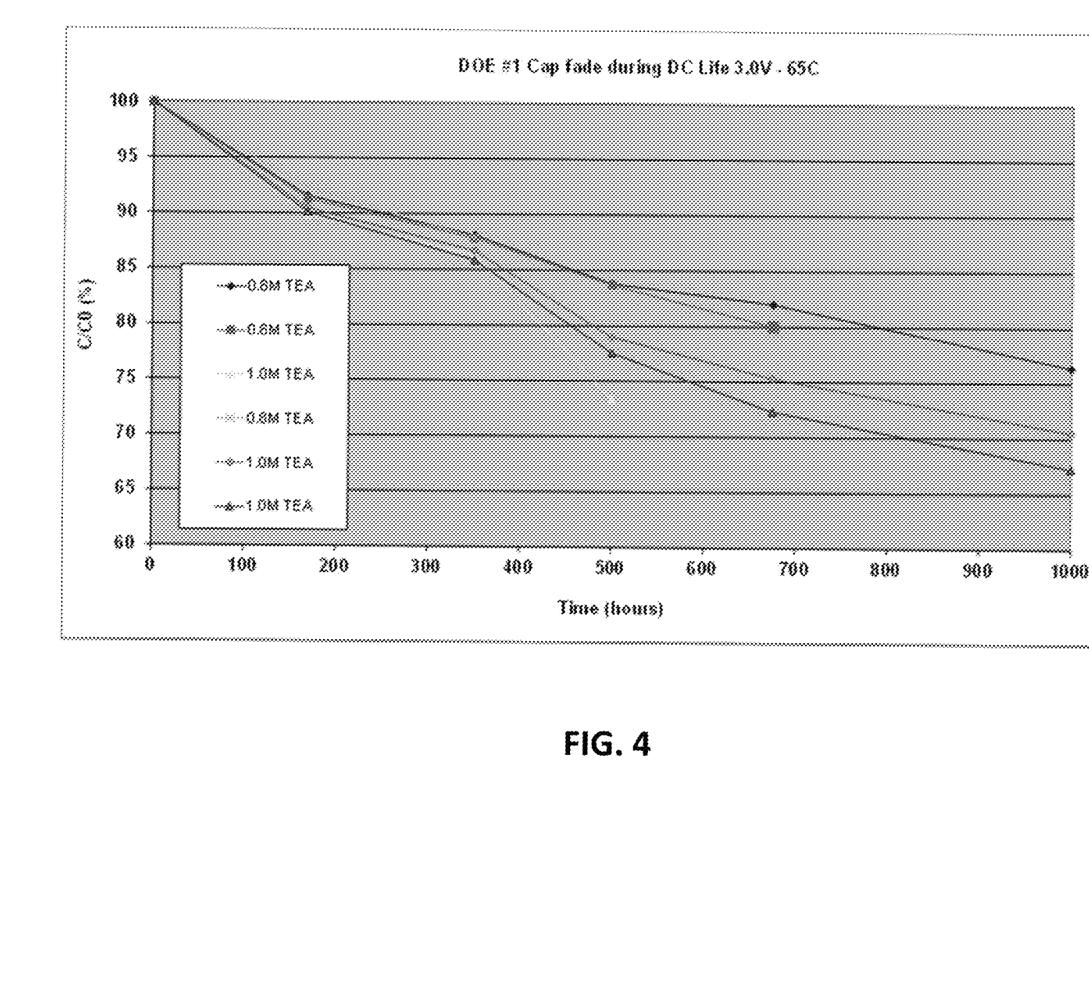
FIG. 4 shows a capacitance performance of an electric double-layer ultracapacitor having a reduced electrolyte concentration.

FIG. 4 is a line graph showing a comparison of capacitance performance between ultracapacitors having different electrolyte concentrations. As shown, several ultracapacitors having an electrolyte solution of 0.8M tetraethyl ammonium tetrafluoroborate in acetonitrile (TEA) were compared to several ultracapacitors having 1.0 M TEA to measure capacitance fade over time. Each ultracapacitor was run at 3.0 volts and 65° C. As shown, ultracapacitors having a reduced electrolyte concentration of 0.8M were found to have a reduced capacitance fade overtime in comparison to ultracapacitors having a 1M TEA electrolyte. As shown at 500 hours, the ultracapacitors with 0.8M TEA had approximately a 78% capacitance fade whereas the ultracapacitors with 1.0M TEA were found to have an about 84% capacitance face.

Other suitable solvents may comprise gamma-butyrolactone, dimethoxyethane, N,N,-dimethylformamide, hexamethyl-phosphorotriamide, propylene carbonate, dimethyl carbonate, tetrahydrofuran, 2-methyltetra-hydrofuran, dimethyl sulfoxide, dimethyl sulfite, sulfolane (tetra-methylene-sulfone), nitromethane, and/or dioxolane. Other suitable salts may comprise methyltriethylammonium tetrafluoroborate, tetrabutylammonium tetrafluoroborate, tetraethylammonium hexafluorophosphate tetraalkylphosphonium salts (e.g., tetraethylphosphonium tetrafluoroborate, tetrapropylphosphonium tetrafluoroborate, tetrabutylphosphonium tetrafluoroborate, tetrahexylphosphonium tetrafluoroborate, tetraethylphosphonium hexafluorophosphate tetraethylphosphonium trifluoromethylsulfonate) and/or lithium salts (e.g., lithium tetrafluoroborate, lithium hexafluorophosphate, lithium trifluoromethylsulfonate).

Separator

As described herein, an electric double-layer capacitor may have a separator immersed in an electrolyte and positioned between the positive electrode and the negative electrode (e.g., the positive and negative electrodes, 22, 24, shown in FIG. 1). The separator enables electrical isolation of one electrode from another in an ultracapacitor, for example preventing an electrical short between the positive electrode and the negative electrode, while allowing transport of ions between the two electrodes. For example, the separator may comprise a porous material with sufficient wettability to the electrolyte so as to facilitate ion mobility between the positive and negative electrodes. The separator may be made of a material having mechanical strength, chemical stability and/or electrochemical stability, including for example, a material which maintains or substantially maintains its physical, electrical and/or chemical properties under conditions of the manufacturing process and/or the operating conditions of the capacitor. In some embodiments, the separator is made from cellulose, including for example cellulose fiber.

A separator can have a thickness optimized to provide a sufficient separation between electrodes of the ultracapacitor while having a reduced volume (e.g., for facilitating an ultracapacitor with a reduced volume and/or weight, and/or an ultracapacitor having increased volume for its other components). For example, a separator can have a thickness of about 20 μm to about 50 μm. For example, a separator made of cellulose can have a thickness of about 30 μm.

Electrode

Figure 5:
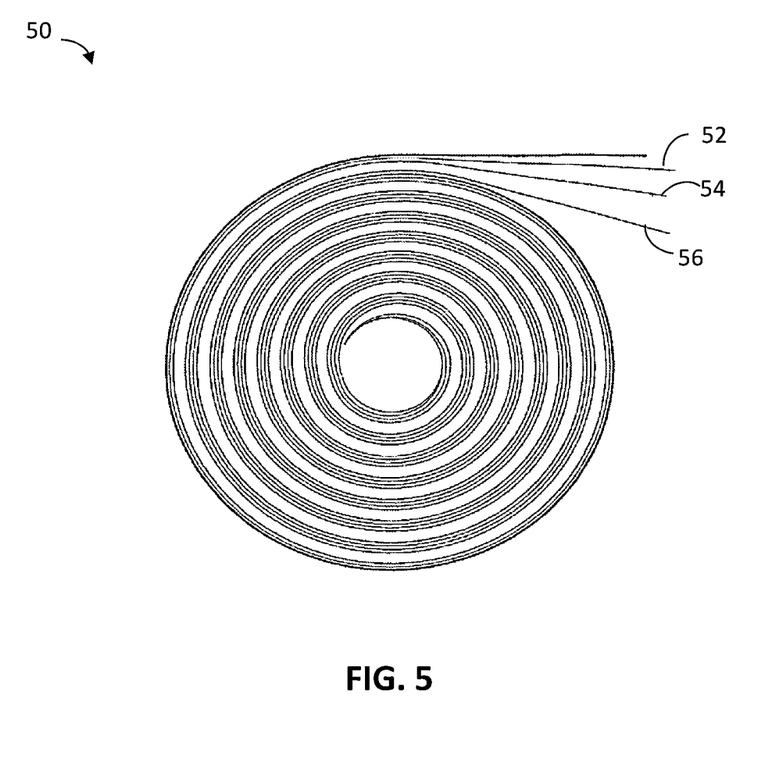
FIG. 5 shows a cross sectional top view of electric double-layer ultracapacitor in a jelly-roll configuration.

A capacitance of the electric double-layer ultracapacitor depends at least partially on the surface area available to store electrical charge, and particularly the surface area available on the electrodes of the capacitor. Referring to FIG. 5, an electric double layer ultracapacitor 50 is illustrated having a separator 54 positioned between a positive electrode 52 and a negative electrode 56. In this case, the ultracapacitor 50 is shown to have been wound or rolled into a "jelly-roll" configuration. The jelly-roll configuration may enable storage of an increased surface area in a compact space. In some embodiments, the positive electrode 52 and/or the negative electrode 56 comprise active portions of the ultracapacitor comprising porous material having very large effective area per unit volume, i.e., very large normalized effective surface area.

Optimized Electrode Carbon Microporosity, Mesoporosity and Macroporosity

In another embodiment, the ultracapacitor running at 3 volts may have one or more carbon based layers (e.g., carbon based layers 82, 84 of FIG. 6) in an ultracapacitor electrode that includes a carbon material having a desired microporosity (e.g., pores having a diameter of less than about 2 nanometers (nm)), mesoporosity (e.g., pores having a diameter of about 2 nm to about 50 nm) and/or macroporosity (e.g., pores having a diameter of greater than about 50 nm). For example, the electrode may be made at least partially of activated carbon having an optimized microporosity, mesoporosity and/or macroporosity for improved performance at three volts or more. The microporosity, mesoporosity and/or macroporosity of the carbon based layers may be optimized to facilitate ion mobility within the layers and/or a capacitance value of the layers. Ions within an electrolyte of the capacitor may migrate within electrodes of the capacitor after a number of charge-discharge cycles, becoming trapped within pores (e.g., micropores) of an electrode. Trapped ions may become unavailable for further charge discharge cycles and may contribute at least in part to a deterioration in an operating characteristic of the capacitor, including for example an increase in an equivalent series resistance (ESR) value and/or a reduction in the capacitance performance. In some embodiments, the carbon material can have a reduced microporosity to reduce a space in which ions may be trapped. Reducing a microporosity of a carbon based layer may facilitate access of ions to active surfaces of the electrode. A carbon based layer can have an optimized microporosity, mesoporosity, and/or macroporosity to reduce trapping of ions within pores of the carbon based layers, while providing desired carbon based layer capacitance performance.

In some embodiments, a carbon based layer can have a microporosity of about 60% to about 85%, for example about 70% or about 75% or about 80%. In some embodiments, a carbon based layer can have a mesoporosity of about 10% to about 35%, for example about 20% or about 25%. In some embodiments, a carbon based layer can have a macroporosity of less than about 5%, for example about 1%. In some embodiments, a reduction in microporosity and an increase in a mesoporosity can provide improved ESR performance and/or capacitance performance. For example, a reduction of microporosity by about 20% to about 25% may facilitate a reduction in an ESR value by about 20% to about 30% for an ultracapacitor operating at 3 volts or higher and at about 65° C. In some embodiments, a carbon based layer of an electrode can have a microporosity within a range of from about 70% to about 85%, a mesoporosity of about 10% to about 30%, and a macroporosity within a range of less than about 5%, for example about 1%.

Figure 6:
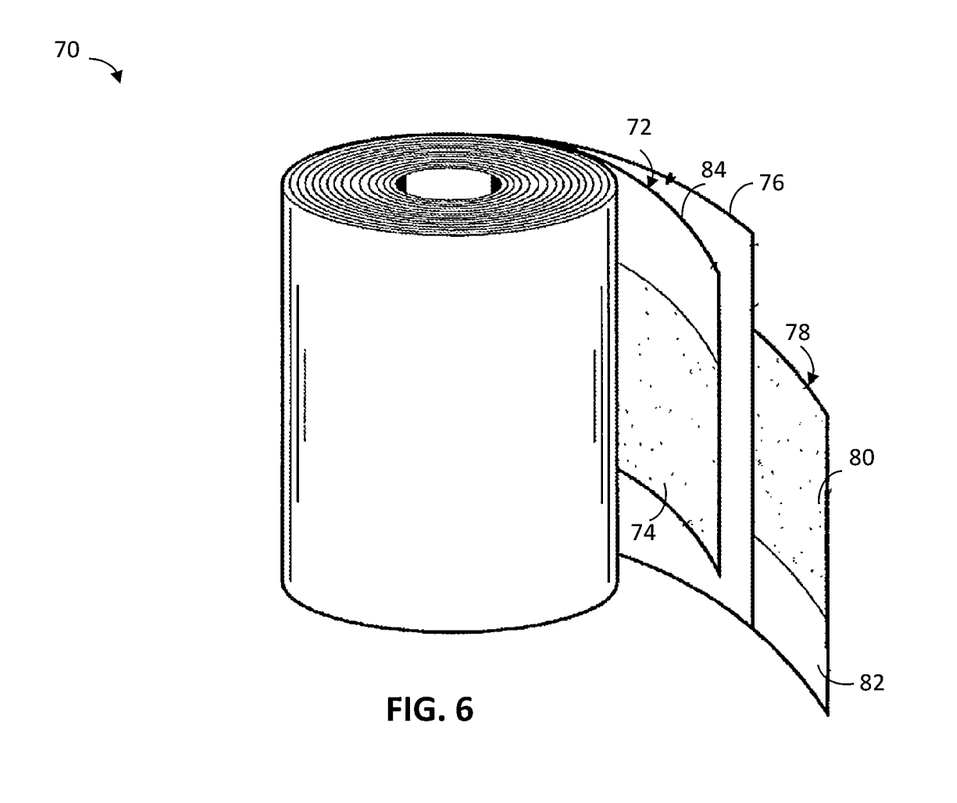
FIG. 6 is a perspective view showing various layers of an electric double-layer ultracapacitor in a jelly-roll configuration.

In some embodiments, a compacted carbon based layer having an optimized composition, packing density, microporosity, and/or macroporosity is adhered to one or more surfaces of a current collector (e.g., the current collectors 84, 82 shown in FIG. 6). For example, a first and/or the second carbon based layers may be adhered onto a surface of the current collector through a laminating process. The first and/or second carbon based layers may be adhered directly or indirectly onto a surface of the current collector, for example, optionally including an adhesive layer (e.g., a conductive adhesive layer) to promote adhesion between a surface of the current collector and the carbon based layer, and/or to enable a reduced sheet resistance. For example, the adhesive layer comprises a solvent, an adhesive component (e.g., a thermoplastic material), and/or an electrical conductivity enhancer (e.g., graphite and/or other conductive carbon powder). The adhesive layer may also be obtained commercially. For example, a compacted first carbon based layer having an optimized composition, packing density, microporosity, and/or macroporosity may be adhered to a first surface of the current collector and a compacted second carbon based layer having an optimized composition, packing density, microporosity, and/or macroporosity may be adhered to a second surface of the current collector opposite to the first surface. In some embodiments, the carbon based layers have an optimized composition, packing density, microporosity, and/or macroporosity enables improved equivalent series resistance, carbon based layer's structural integrity, improved ion mobility and/or increased ultracapacitor cycle lifetime.

Asymmetric Electrode Thickness

Figure 8:
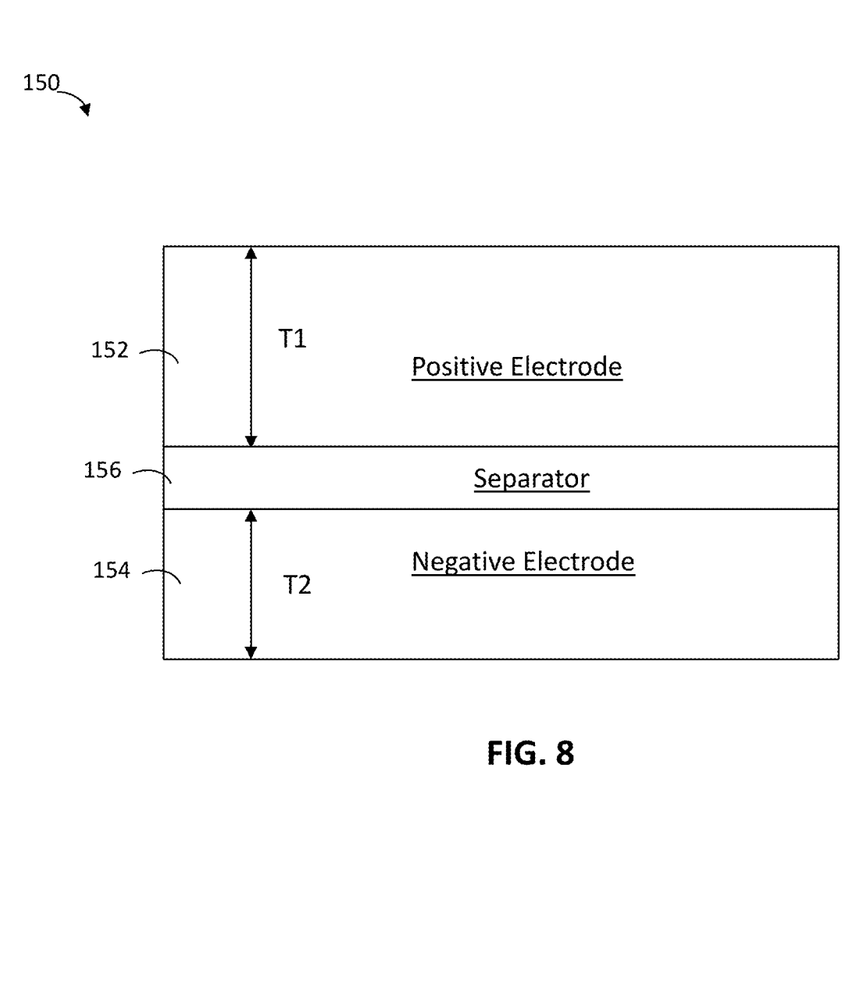
FIG. 8 is a cross-sectional view showing a simplified example electric double-layer ultracapacitor comprising asymmetric electrodes.

In one embodiment of the invention, an ultracapacitor includes a positive electrode having a thickness greater than a thickness of a negative electrode. As shown in FIG. 8, an electric double-layer capacitor 150 may comprise a positive electrode 152 having a first thickness T1 and a negative electrode 154 having a second thickness T2. In some embodiments, the first thickness T1 of a positive electrode 152 is greater than a second thickness T2 of a negative electrode 154.

For example, a first sub-capacitor may be formed at an interface between the positive electrode 152 and the electrolyte (e.g. the electrolyte 26 shown in FIG. 1), and a second sub-capacitor may be formed at an interface between the negative electrode 154 and the electrolyte. An example method to select the first and second thicknesses T1, T2 comprises determining a positive voltage limit for the first sub-capacitor and a negative voltage limit for the second sub-capacitor, dividing the positive voltage limit by the negative voltage limit to obtain a first ratio of the second sub-capacitor to the first sub-capacitor, and setting relative thicknesses of the positive electrode layer and the negative electrode layer so that capacitance of the second sub-capacitor is substantially equal to a product of the first ratio and the capacitance of the first sub-capacitor. Further embodiments regarding one or more methods of determining the first and second thicknesses T1, T2 are provided in U.S. Patent Application Publication No. 2006/0148112, which is incorporated herein by reference in its entirety.

In some embodiments, a carbon based layer (e.g., a carbon based layer can be made of a activated carbon, a binder material and/or an conductive additive) of the positive electrode 152 can have a thickness greater than a thickness of a carbon based layer of the negative electrode 154 by about 20 μm to about 100 μm. For example, a thickness of a carbon based layer of the positive electrode 152 can be about 80 μm to about 200 μm, and a thickness of a carbon based layer of the negative electrode 154 can be about 60 μm to about 160 μm. For example, a first thickness T1 of the positive electrode 152 can include a thickness of a current collector of the positive electrode 152 and a thickness of a carbon based layer on each of the two opposing surfaces of the current collector. A second thickness T2 of the negative electrode 154 can include a thickness of a current collector of the negative electrode 154 and a thickness of a carbon based layer on each of the two opposing surfaces of the current collector of the negative electrode 154.

In some embodiments, the first thickness T1 of a positive electrode 152 is greater than the second thickness T2 of a negative electrode 154 by a percentage within a range of from about 15% to about 40%, including from about 20% to about 30%. For example, the first thickness T1 is greater than the second thickness T2 by about 25%. For example, the first thickness T1 is greater than the second thickness T2 by about 35%.

In some embodiments, an ultracapacitor having asymmetric electrodes (e.g., a positive electrode and a negative electrode having different thicknesses) can demonstrate improved capacitance and/or resistance performance. For example, an ultracapacitor having a positive electrode thicker than a negative electrode can demonstrate an improvement in a capacitance performance of about 5% to about 10% and/or an improvement in a resistance performance of 5% to about 10%, when operated at 3 volts or greater, and at a temperature of about 65° C.

Carbon Surface Modification
  Reduction of Carbon Surface Functional Groups

In one embodiment of the invention, carbon used in one or more electrodes of an ultracapacitor is treated to reduce the number of carbon surface functional groups to enable an improved ultracapacitor performance. As described herein, in some embodiments, an electrode (e.g. the positive and/or negative electrodes 152, 154 shown in FIG. 8) comprises activated carbon. The high surface areas on the activated carbon may be created through a process of chemical and/or thermal oxidative processes. The incomplete oxidation of the carbon may create oxygen-containing functional groups on the carbon surface including carboxyl, carboxylate, hydroxyl, lactone, quinone and phenols. The residual oxygen may contribute to deleterious performance properties of a capacitor. For example, residual oxygen may contribute to capacitance fade on cycling, self-discharge, pseudocapacity, gas formation at high potential voltages and/or increased hydrophilic surface properties which stimulate moisture adsorption. In some embodiments, surface functional groups having nitrogen (N) and/or hydrogen (H) may degrade performance of the ultracapacitor during its operation.

In some embodiments, treated carbon material used in an electrode (e.g. the positive and/or negative electrodes 152, 154 shown in FIG. 8) comprises a reduced number of surface functional groups. For example, activated carbon material used in an electrode may be exposed to a reactant gas (e.g., a reactant gas comprising $CO_2$ and/or $N_2$) and microwave energy at a temperature of at least 300° C. to reduce the number of functional groups residing on the treated carbon material. In some embodiments, a reactant gas comprises a reducing gas. In some embodiments, an electrode carbon material may be treated at a high temperature with a reactant gas comprising a reducing gas to enable, for example, a reduced number of carbon surface functional groups. For example, the electrode carbon material may be treated at a temperature within a range of from about 300° C. to about 1000° C., including from about 500° C. to about 1000° C. For example, activated carbon material of the electrode may be treated at a temperature within a range of from about 500° C. to about 1000° C. with a reducing gas to enable a reduction in a number of activated carbon surface functional groups. Further description regarding methods of carbon surface modification is provided in U.S. Patent Application Publication No. 2009/0097188, which is incorporated herein by reference in its entirety.

In some embodiments, a treated carbon material can have functional groups less than about 1% of which contains hydrogen (e.g., less than about 0.5%), less than about 0.5% of which contains nitrogen (e.g., less than about 0.1%), and/or less than about 5% of which contains oxygen (e.g., less than about 3%). In some embodiments, a treated carbon material can have about 20% to about 50% reduction in the number of functional groups on one or more surfaces of the treated activated carbon. For example, a treated carbon material can have about 30% fewer hydrogen-containing functional groups.

In one example, ultracapacitors with varying functional groups were tested for the amount of pressure each ultracapacitor built up over time within the device. The following table shows the carbon functional modifications for each test carbon. Each pressure test was performed at 3 volts and 65° C.

| Carbon | [O] | [N] | [H] |
| --- | --- | --- | --- |
| Carbon 1 | 0.68 | 0.41 | 0.55 |
| Carbon 2 | 0.74 | 0.49 | 0.69 |
| Carbon 3 | 0.90 | 0.57 | 0.88 |

Figure 7:
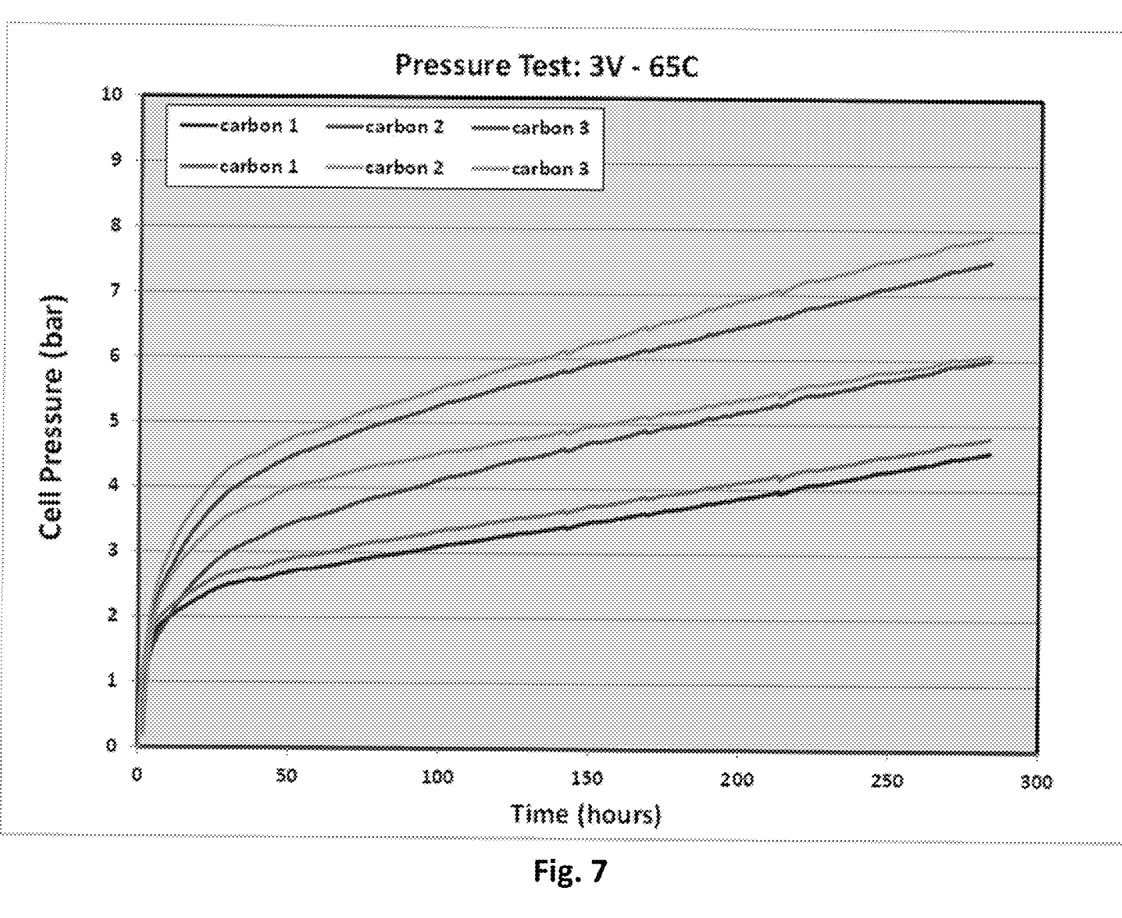
FIG. 7 is a line graph showing the results of modifying the carbon surface characteristics of an ultracapacitor electrode.

As shown in FIG. 7, improved performance was found for electrodes having carbons with lower surface functional group concentrations. For example, at 3 volts and 65° C., Carbon 1 was found to only have an internal cell pressure of about 4.5 bar after 250 hours of operation in comparison to Carbon 3 which was found to have an internal pressure of over 7 bar for the same amount of operation. This shows that carbon electrodes with a lowered surface functional group concentration were found to provide for a device that could perform for longer while reducing the internal pressure within the ultracapacitor package.

Modification of a Carbon Surface Functional Group to Reduce an Electrochemical Potential of the Electrode One embodiment of the invention includes an ultracapacitor configured to operate at an operating voltage of 3 volts or greater where the ultracapacitor includes one or more electrodes comprising carbon material treated with a reactant gas to enable the one or more electrodes to maintain a reduced electrochemical potential during operation of the ultracapacitor. For example, one or more surface functional groups of an electrode carbon material can be modified to change an electrochemical potential of the electrode. In some embodiments, carbon material of an electrode may be treated with a reactant gas comprising fluorine, and/or nitrogen to modify a surface characteristic of the carbon. The electrode carbon material treated with a reactant gas comprising fluorine and/or carbon may enable the electrode to maintain or substantially maintain, during operation of the ultracapacitor, an electrochemical potential lower than a voltage at which one or more secondary parasitic reactions can be generated, facilitating, for example, improved performance of the electrode at increased operating voltages. For example, a positive electrode of an ultracapacitor comprising a carbon material treated with a reactant gas comprising fluorine and/or nitrogen may be able to maintain or substantially maintain, during operation of the ultracapacitor, an electrochemical potential lower than a voltage at which one or more secondary parasitic reactions can be generated, facilitating, for example, an improved performance of the ultracapacitor at increased operating voltages.

In some embodiments, electrode carbon material may be treated with a reactant gas to add one or more favorable functional groups on one or more surfaces of the carbon material. For example, one or more surfaces of activated carbon material of an electrode may be modified to improve a wettability, conductivity and/or a resistance of the electrode.

Carbon Surface Coating

In one embodiment of the invention, an ultracapacitor configured to provide desired operation at an operating voltage of 3 volts or greater includes one or more electrodes comprising carbon material that is treated to provide a protective coating one or more surfaces of the carbon material. In some embodiments, one or more electrodes of the ultracapacitor include treated carbon material to provide one or more coatings on a surface of the carbon material to reduce chemical degradation of the carbon surface. A suitable material for protecting the carbon surface from degradation can include, for example, a material having electrochemical stability at temperatures in which the ultracapacitor operates, and/or maintains or substantially maintains carbon surface area and/or ion mobility within the electrode. Treated carbon material may include any carbon material used to make the electrode, including for example activated carbon, graphite, and/or carbon black.

For example, the protective coating may comprise a porous ceramic material. In some embodiments, the protective coating comprises a metallic material that can protect the carbon surface and/or provide enhanced conductivity for the treated carbon material (e.g., metallic decorating of the carbon surface using silver atoms). In some embodiments, the protective coating comprises silicon carbide and/or metallic oxides (e.g., oxides of tin, oxides of titanium, zinc oxide).

The one or more protective coatings may be applied to the carbon material before the carbon material is incorporated into the ultracapacitor electrode, and/or after the carbon material is incorporated into the electrode (e.g., in-situ). For example, an in-situ modification of a carbon surface may comprise use of one or more electrolyte additives (e.g., one or more additives as described herein). The one or more additives may form a protective coating on one or more surfaces of the carbon material, for example enabling a reduction in the formation of byproducts and/or a reduction in carbon surface contamination.

Improved 3V Ultracapacitor

One embodiment is an electric double-layer ultracapacitor configured to provide desired operation at increased operating voltages, for example an operating voltage of 3 volts (V), can include one or more of the features described herein. The device can operate at 65° C. for more than 1500 hours, and/or greater than or equal to 500 k cycles, for example, while maintaining more than 80% of its initial capacitance, and/or less than about 200% of its initial equivalent series resistance. In this embodiment, the electric ultracapacitor includes an electrolyte comprising tetraethyl ammonium tetrafluoroborate and/or spiro-(1,1')-bipyrrolidinium tetrafluoroborate in acetonitrile at a concentration of about 0.8 mol/L (M). In addition, the device is placed within a housing component having a barrier film on the interior surface of the housing that is exposed to the electrolyte. This barrier protects the device from reactions between the electrolyte and the metallic inner surface of the capacitor housing.

Within the device is a separator made of a cellulose fiber which also reduces the rate of any reaction that may degrade the separator. In addition to these features, the device also includes electrodes that have a carbon layer with an optimized composition, packing density, microporosity, and/or macroporosity and so that the carbon electrodes are configured to provide the most advantageous properties when acting at 3.0 volts.

In addition, the thickness of the positive electrode is made thicker than the thickness of the negative electrode anode to provide desired operation at increased operating voltages.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. An ultracapacitor, comprising:
a first current collector and a second current collector;
a positive electrode electrically coupled to the first current collector;
a negative electrode electrically coupled to the second current collector,
wherein at least one of the positive electrode and the negative electrode comprises a carbon based layer having a mesoporosity of about 20% to about 25%, and a microporosity of about 70% to about 80%;
a separator positioned between the positive electrode and the negative electrode;
an electrolyte in ionic contact with the positive electrode and the negative electrode; and
a housing component to retain the positive electrode, the negative electrode, the separator and the electrolyte and wherein the ultracapacitor is capable of operating at 3 volts at a temperature of 65° C. or greater while maintaining less than 200% of its initial equivalent series resistance for over 1500 hours.

2. The ultracapacitor of claim 1, wherein the ultracapacitor is capable of operating at 65° C. with a cycle life of greater than 500 k cycles.

3. The ultracapacitor of claim 1, wherein the ultracapacitor is configured to operate at 3 volts or greater at 65° C. and maintaining greater than 80% of its initial capacitance for over 1500 hours.

4. The ultracapacitor of claim 1, wherein the carbon based layer comprises a macroporosity of less than about 5%.

5. The ultracapacitor of claim 1, wherein the carbon based layer comprises a macroporosity of less than about 1%.

6. The ultracapacitor of claim 1, wherein the positive electrode comprises a first thickness and the negative electrode comprises a second thickness, wherein the first thickness of the positive electrode is greater than the second thickness of the negative electrode.

7. The ultracapacitor of claim 6, wherein the first thickness is greater than the second thickness by 10%.

* * * * *